US011279476B2

(12) United States Patent
Cravener (10) Patent No.: US 11,279,476 B2
(45) Date of Patent: Mar. 22, 2022

(54) PASSIVE HUB FLAPPING LOCK

(71) Applicant: TEXTRON INNOVATIONS INC., Providence, RI (US)

(72) Inventor: Kyle Thomas Cravener, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 17/102,552

(22) Filed: Nov. 24, 2020

(65) Prior Publication Data

US 2021/0147072 A1    May 20, 2021

Related U.S. Application Data

(63) Continuation of application No. 16/168,028, filed on Oct. 23, 2018, now Pat. No. 11,008,094.

(51) Int. Cl.
*B64C 27/32* (2006.01)

(52) U.S. Cl.
CPC .................................. *B64C 27/322* (2013.01)

(58) Field of Classification Search
CPC ......... B64C 11/02; B64C 11/04; B64C 11/06; B64C 27/322; B64C 27/04
See application file for complete search history.

(56) References Cited

U.S. PATENT DOCUMENTS

| 5,820,341 | A  | * | 10/1998 | Mondet | B64C 27/322 |
| | | | | | 416/46 |
| 2007/0196210 | A1 | * | 8/2007 | Carbaugh | B64C 27/322 |
| | | | | | 416/140 |
| 2015/0239556 | A1 | * | 8/2015 | Massal | B64C 27/605 |
| | | | | | 416/46 |
| 2015/0274290 | A1 | * | 10/2015 | Fenny | B64C 27/615 |
| | | | | | 244/17.25 |
| 2019/0047691 | A1 | * | 2/2019 | Schank | B64C 37/00 |
| 2020/0055593 | A1 | * | 2/2020 | Schank | B64C 27/50 |

* cited by examiner

*Primary Examiner* — Philip J Bonzell
*Assistant Examiner* — Cindi M Curry
(74) *Attorney, Agent, or Firm* — Edwin S. Flores; Daniel J. Chalker; Chalker Flores, LLP (57) ABSTRACT

A passive hub flapping lock including: one or more lever arms, each lever arm rotatably coupled to a pivot and comprising a first lever arm end and a second lever arm end; one or more stop wedges; one or more frames coupled to the one or more stop wedges, each frame coupled to the first lever arm end of one of the one or more lever arms; one or more weight sets, each weight set comprising one or more weights coupled to the second lever arm end of one of the one or more lever arms; and one or more pivot torsion springs, each pivot torsion spring positioned at the pivot.

24 Claims, 11 Drawing Sheets

PASSIVE HUB FLAPPING LOCK

CROSS-REFERENCE TO RELATED APPLICATIONS

This application is a continuation of and claims priority to U.S. patent application Ser. No. 16/168,028 filed on Oct. 23, 2018. The entire content of the foregoing patent application is hereby incorporated by reference for all purposes.

STATEMENT OF FEDERALLY FUNDED RESEARCH

Not applicable.

TECHNICAL FIELD OF THE INVENTION

The present invention relates in general to the field of aircraft propulsion. In particular, the present invention relates to mast sleeves in rotorcraft.

BACKGROUND OF THE INVENTION

Without limiting the scope of the invention, its background is described in connection with rotorcraft with rotors that may be folded for transport.

When rotors in rotorcraft are stationary or rotating slowly, including when the rotors are folded and secured for stowage, there exists the possibility the rotor will flap and contact the mast sleeve, with the possibility of damage to the mast sleeve, the rotor, or both. A device for preventing such contact that is relatively lightweight and operates automatically is desirable.

SUMMARY OF THE INVENTION

In some embodiments of the disclosure, a passive hub flapping lock is disclosed as including one or more stop wedges; one or more frames coupled to the one or more stop wedges; one or more rods coupled to the one or more frames, and each rod comprising a bracket; one or more lever arms, each lever arm rotatably coupled to a pivot and coupled at a first lever arm end to one of the one or more rods at the bracket of the rod; one or more weight sets, each weight set coupled to a second lever arm end; and one or more pivot torsion springs, each pivot torsion spring positioned at a pivot and biased to hold the flapping lock in an engaged position when stationary or at a rotational speed below a specified rotational speed; wherein the flapping lock is in an engaged position when stationary or at a rotational speed below the specified rotational speed and wherein the flapping lock is in a disengaged position when at a rotational speed above the specified rotational speed and the one or more weight sets move outward, rotating the one or more lever arms. In one aspect, the one or more stop wedges comprise an elastomeric material, a foam, a soft metal, or a combination of two or more of those materials. In another aspect, the one or more rods are held in place or stabilized by one or more rod sleeves. In another aspect, at least a portion of each of the one or more rod sleeves adjacent to a mast sleeve or a mast is coated with one or more substances to reduce a friction of a motion of the one or more rod sleeves against the mast sleeve or the mast. In another aspect, the rod sleeves comprise linear ball bearings. In another aspect, each of the one or more lever arms is coupled to one of the one or more rods with a roller bearing directly or with a link. In another aspect, each of the one or more weight sets is adjustable to set the specified rotational speed. In another aspect, at least a portion of a mast sleeve, a mast, or each frame is coated with one or more substances to reduce a friction of a motion of the one or more frames against the mast sleeve or the mast.

In some embodiments of the disclosure, a method of preventing rotor flapping is disclosed as including providing one or more stop wedges mounted on one or more frames to be inserted into a space between a mast sleeve or a mast and a rotor yoke to prevent hub flapping; lowering the one or more stop wedges into the space when stationary or at a rotational speed below a specified rotational speed; raising the one or more stop wedges out of the space at the specified rotational speed; keeping the one or more stop wedges out of the space when above the specified rotational speed; and controlling a position of the one or more stop wedges with one or more weight sets coupled to one or more lever arms that are coupled to the one or more stop wedges, wherein the one or more weight sets move outward at the specified rotational speed, moving the lever arms such that the one or more stop wedges are raised from the space. In one aspect, the one or more stop wedges comprise an elastomeric material, a foam, a soft metal, or a combination of two or more of those materials. In another aspect, one or more rods couple the one or more stop wedges with the one or more lever arms. In another aspect, each of the one or more lever arms is coupled to one of the one or more rods with a roller bearing directly or with a link. In another aspect, the one or more rods are held in place or stabilized by one or more rod sleeves. In another aspect, at least a portion of each of the one or more rod sleeves adjacent to the mast sleeve or the mast is coated with one or more substances to reduce a friction of a motion of the one or more rod sleeves against the mast sleeve or the mast. In another aspect, the one or more sleeves comprise linear ball bearings. In another aspect, each of the one or more weight sets is adjustable to set the specified rotational speed. In another aspect, at least a portion of the mast sleeve, the mast, or each frame is coated with one or more substances to reduce a friction of a motion of the one or more frames against the mast sleeve or the mast.

In some embodiments of the disclosure, a rotorcraft is disclosed as including a fuselage; one or more engines coupled to the fuselage; each of the one or more rotor assemblies comprising a flapping lock, the flapping lock comprising: one or more stop wedges; one or more frames coupled to the one or more stop wedges; one or more rods coupled to the one or more frames, and each rod comprising a bracket; one or more lever arms, each lever arm rotatably coupled to a pivot and coupled at a first lever arm end to one of the one or more rods at the bracket of the rod; one or more weight sets, each weight set coupled to a second lever arm end; and one or more pivot torsion springs, each pivot torsion spring positioned at a pivot and biased to hold the flapping lock in an engaged position when stationary or at a rotational speed below a specified rotational speed; wherein the flapping lock is in an engaged position when stationary or at a rotational speed below the specified rotational speed and in a disengaged position when at a rotational speed above the specified rotational speed and the one or more weight sets move outward, rotating the one or more lever arms.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIGS. 1, 2, 3A, 3B, 4A, and 4B illustrate non-limiting examples of rotorcraft with which the present invention may be used.

Figure 1:
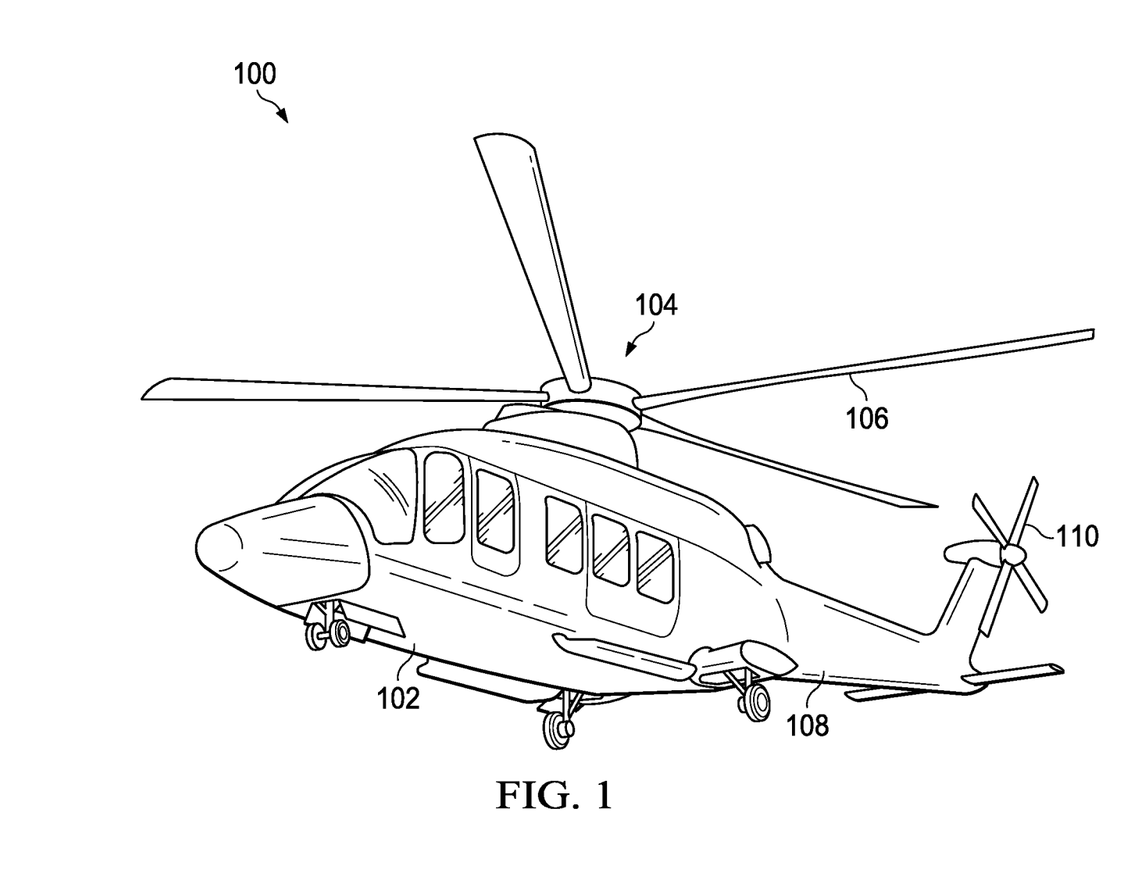
FIG. 1 shows a side view of a helicopter according to a particular embodiment of the present invention.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
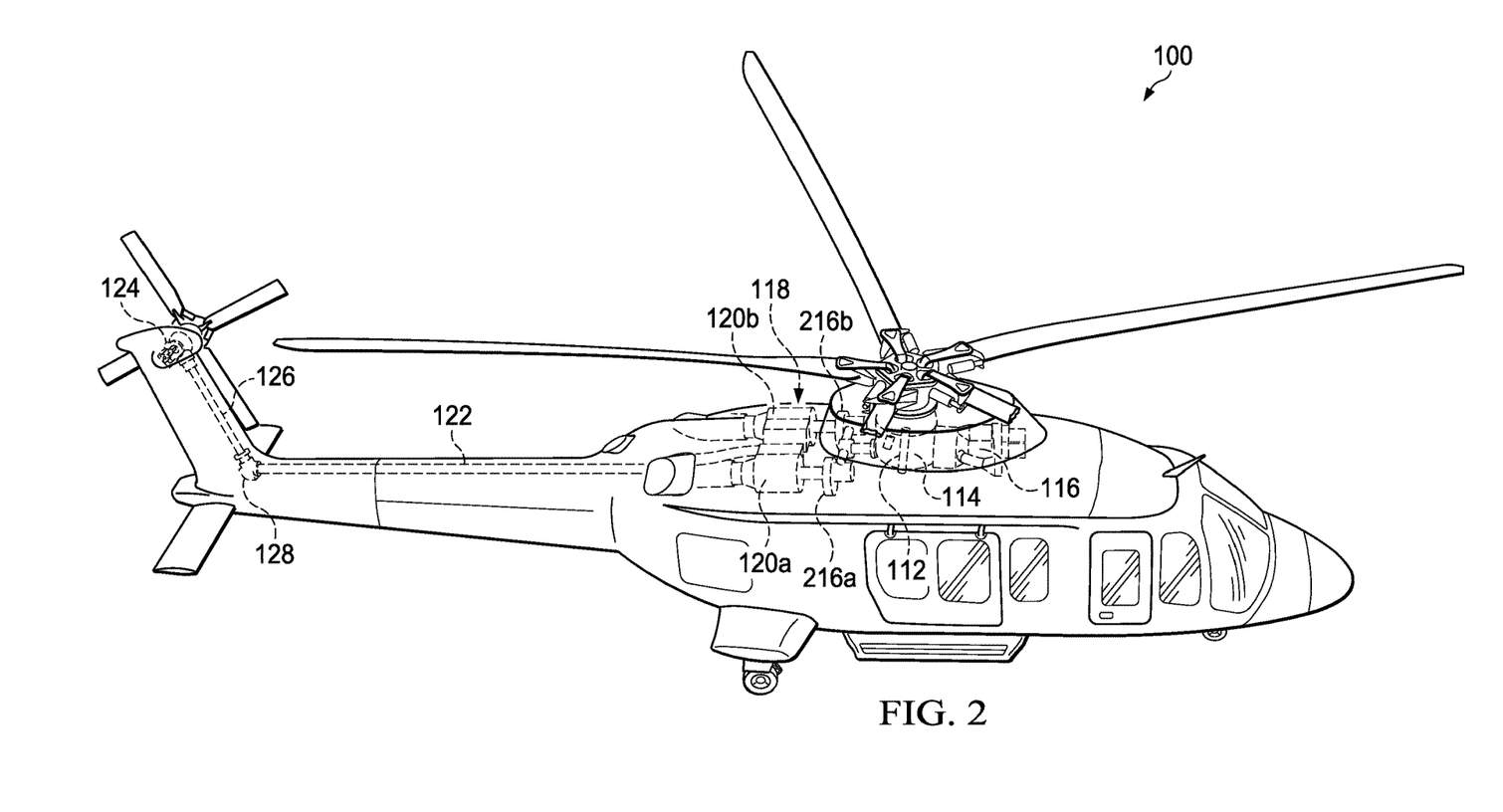
FIG. 2 shows a partial cross-section, perspective view of a helicopter according to an embodiment of the present invention.

For example, FIG. 2 shows a partial cross-section perspective view of aircraft 100 that includes additional detail of the present invention. Aircraft 100 further includes a rotor mast 112, which is connected to the main rotor gearbox 114 via a main rotor mast. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation to the tail rotor gear box 124, which is connected via tail rotor drive shaft 126 and intermediate gear box 128.

Figure 3A:
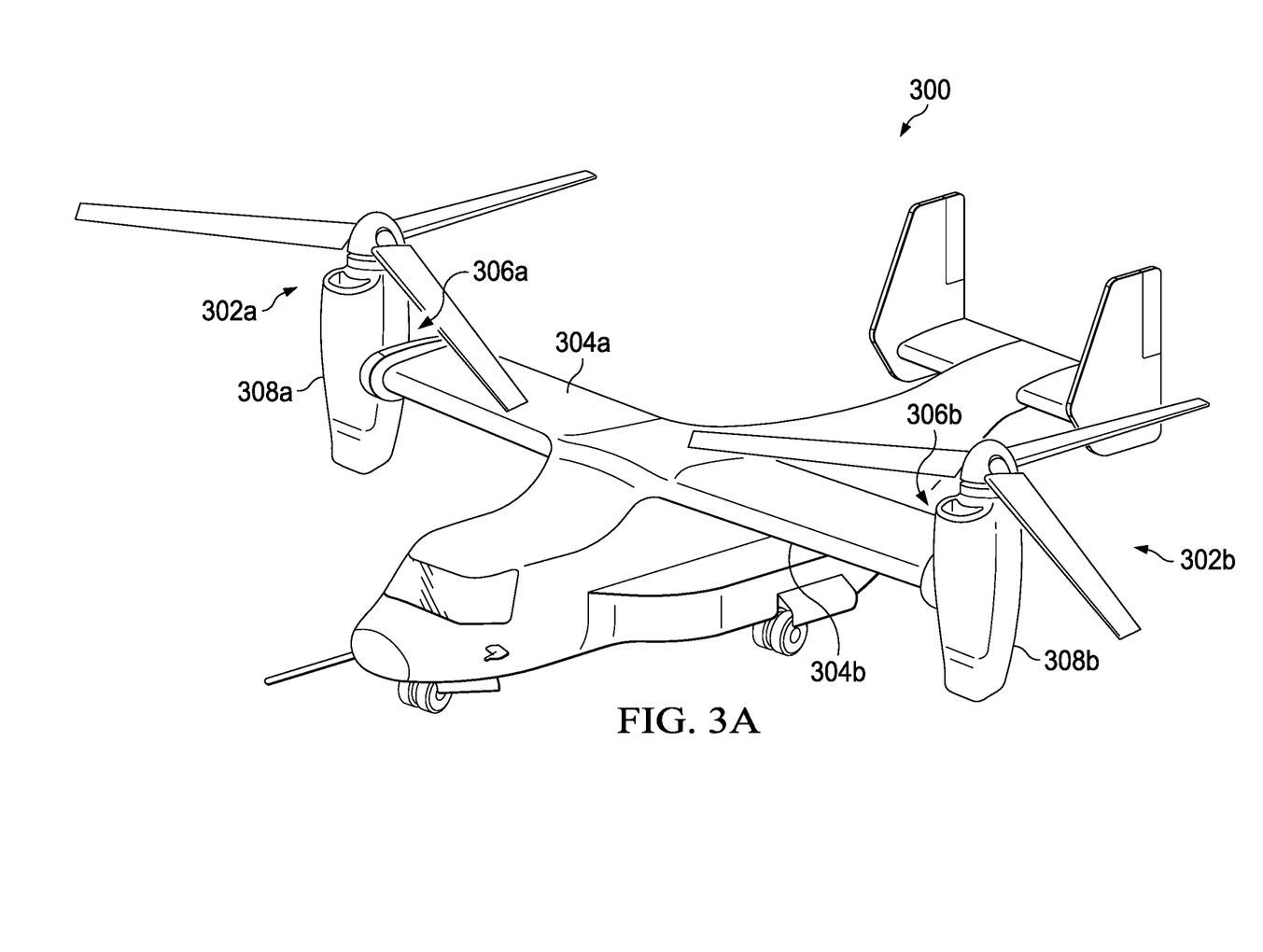
FIG. 3A shows a perspective view of a first tiltrotor aircraft in which the rotor system is in a takeoff-and-landing mode or hover mode according to a particular embodiment of the present invention.
Figure 3B:
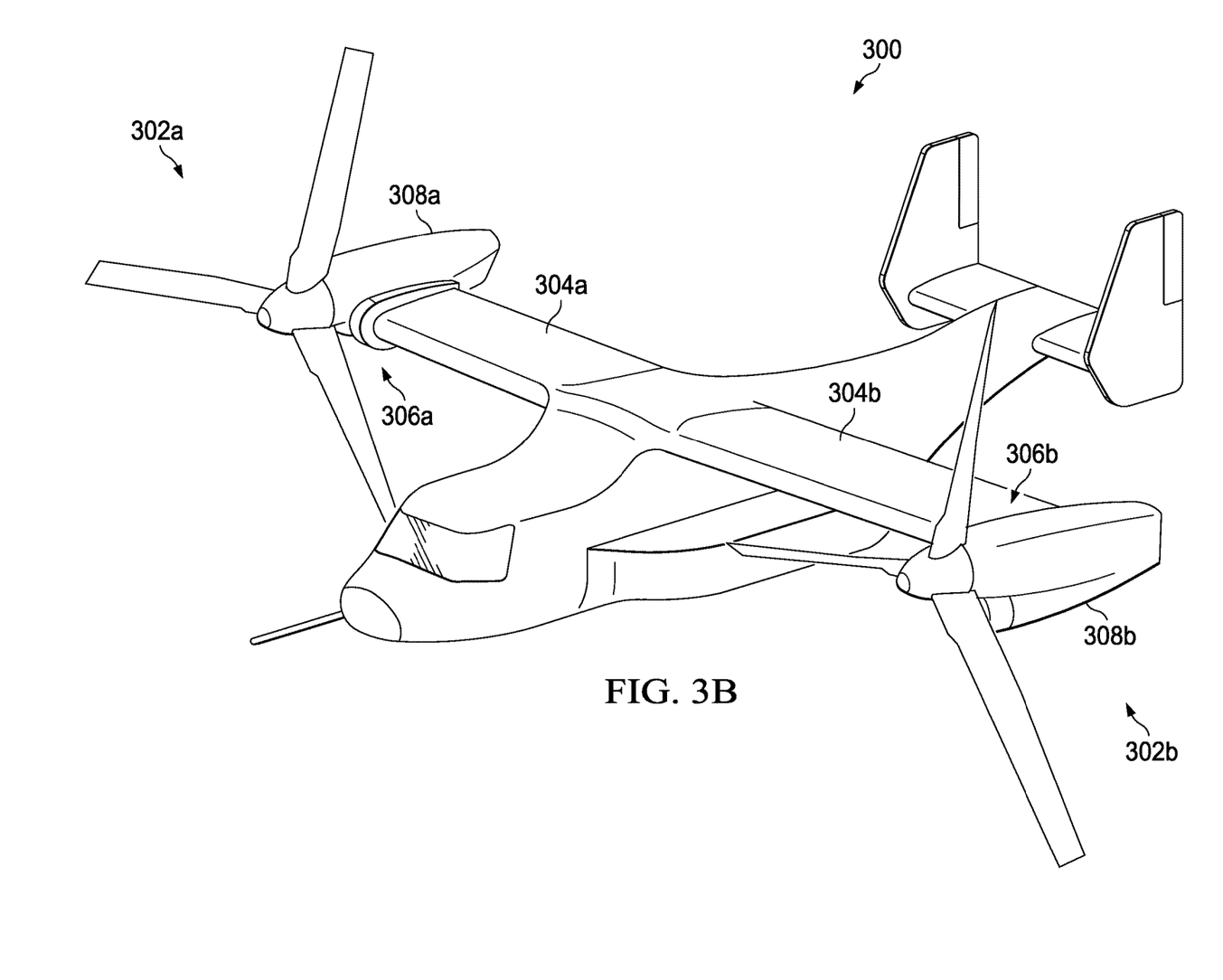
FIG. 3B shows a perspective view of the first tiltrotor aircraft in which the rotor system is in a cruise mode according to a particular embodiment of the present invention.

FIGS. 3A and 3B show a tiltrotor aircraft 300 that utilizes the system and methods in accordance with the present invention. FIG. 3A illustrates the tiltrotor aircraft 300 in takeoff-and-landing mode or hover mode, and FIG. 3B depicts the tiltrotor aircraft 300 in cruise mode. Tiltrotor aircraft 300 includes proprotor assemblies 302a and 302b that are carried by wings 304a and 304b, and are disposed at end portions 306a and 306b of wings 304a and 304b, respectively. Proprotor assemblies 302a and 302b include nacelles 308a and 308b, which carry the engines and transmissions of tiltrotor aircraft 300. Proprotor assemblies 302a and 302b move or rotate relative to wings 304a and 304b between a helicopter or hover mode in which proprotor assemblies 302a and 302b are tilted upward, such that tiltrotor aircraft 300 flies like a conventional helicopter; and an airplane or cruise mode in which proprotor assemblies 302a and 302b are tilted forward, such that tiltrotor aircraft 300 flies like a conventional propeller driven aircraft.

Figure 4A:
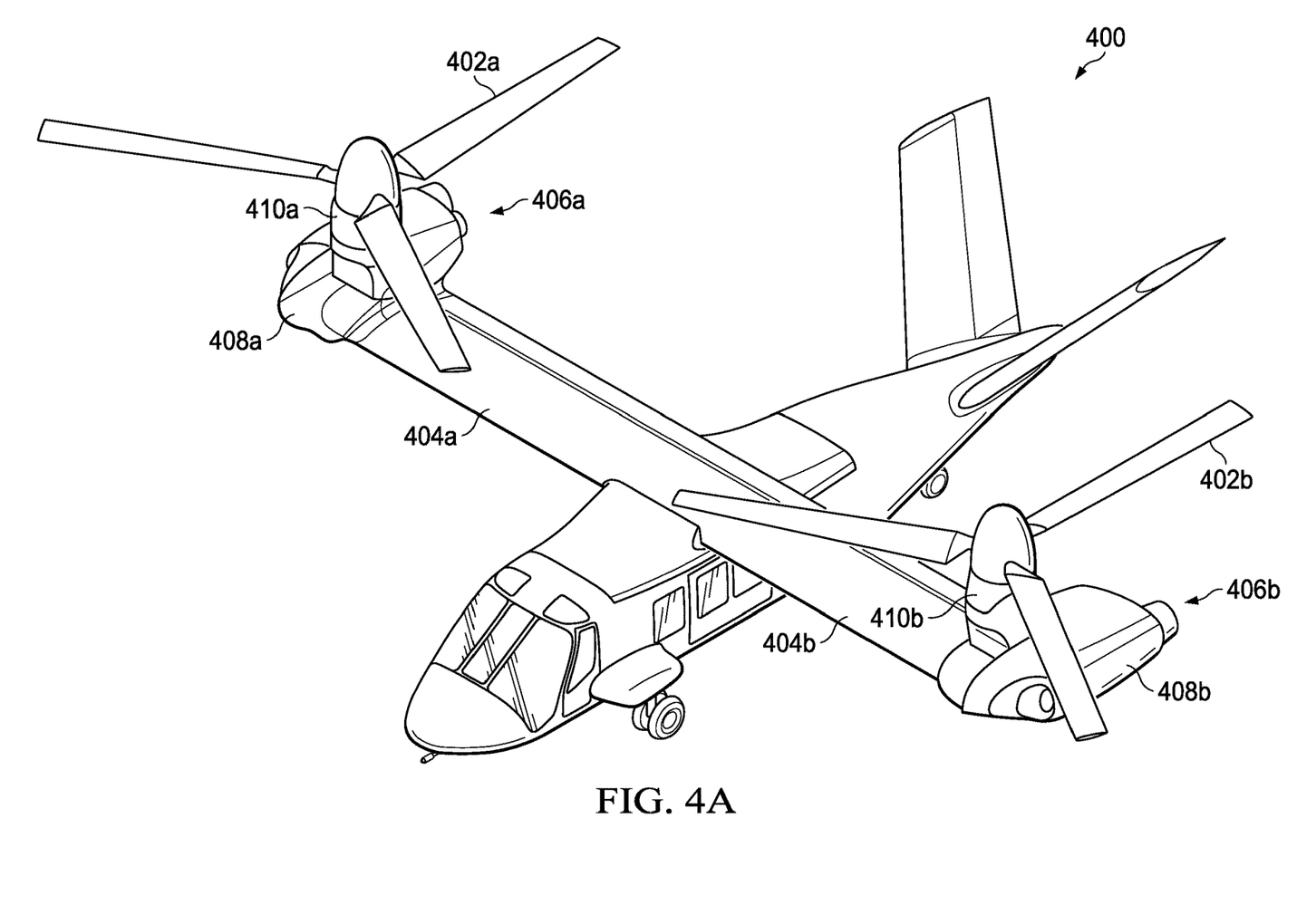
FIG. 4A shows a perspective view of a second tiltrotor aircraft in which the rotor system is in a takeoff-and-landing mode or hover mode according to a particular embodiment of the present invention.
Figure 4B:
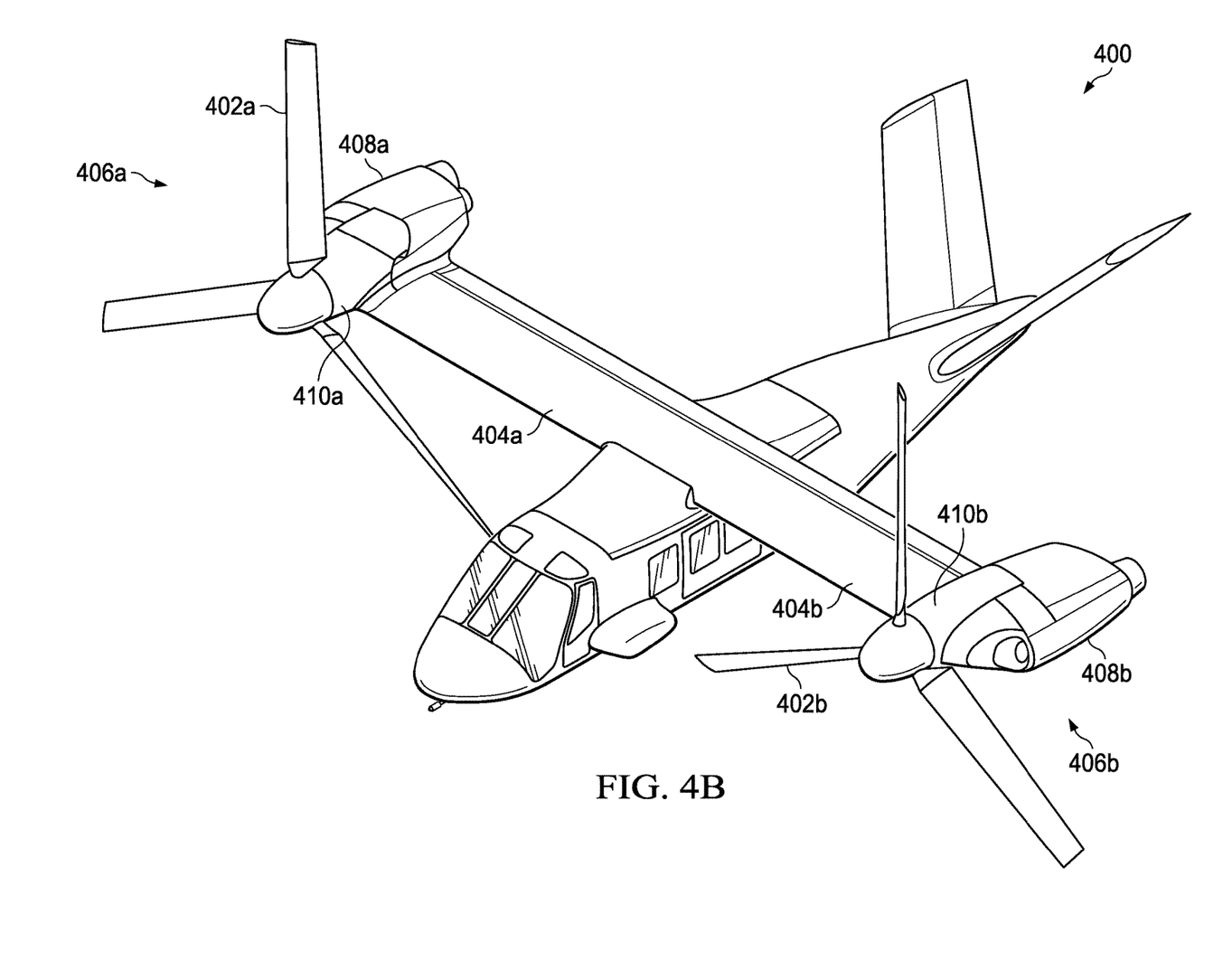
FIG. 4B shows a perspective view of the second tiltrotor aircraft in which the rotor system is in a cruise mode according to a particular embodiment of the present invention.

FIGS. 4A and 4B show another tiltrotor aircraft 400 that utilizes the system and methods in accordance with the present invention. FIG. 4A depicts the tiltrotor aircraft 400 in takeoff-and-landing mode or hover mode, and FIG. 4B illustrates the tiltrotor aircraft 400 in cruise mode. Tiltrotor aircraft 400 includes proprotor assemblies 402a and 402b that are carried by wings 404a and 404b, and are disposed at end portions 406a and 406b of wings 404a and 404b, respectively. Proprotor assemblies 402a and 402b include nacelles 408a and 408b, which include the engines and transmissions of tiltrotor aircraft 400. In this embodiment, the engines are fixed to the wing and do not rotate, rather, only the pylons 410a and 410b with the proprotor assemblies 402a and 402b rotate. Proprotor assemblies 402a and 402b move and rotate relative to wings 404a and 404b and the nacelles 408a and 408b. The proprotor assemblies 402a and 402b do not more relative to the wings 404a and 404b. Instead, during the transition between a helicopter or hover mode only the pylons 410a and 410b with the proprotor assemblies 402a and 402b rotate to redirect the thrust from the proprotor assemblies 402a and 402b. The tiltrotor aircraft 400 is still able to fly like a conventional helicopter; and an airplane or cruise mode in which one of the rotors are tilted forward, such that tiltrotor aircraft 400 flies like a conventional propeller driven aircraft.

Figure 5:
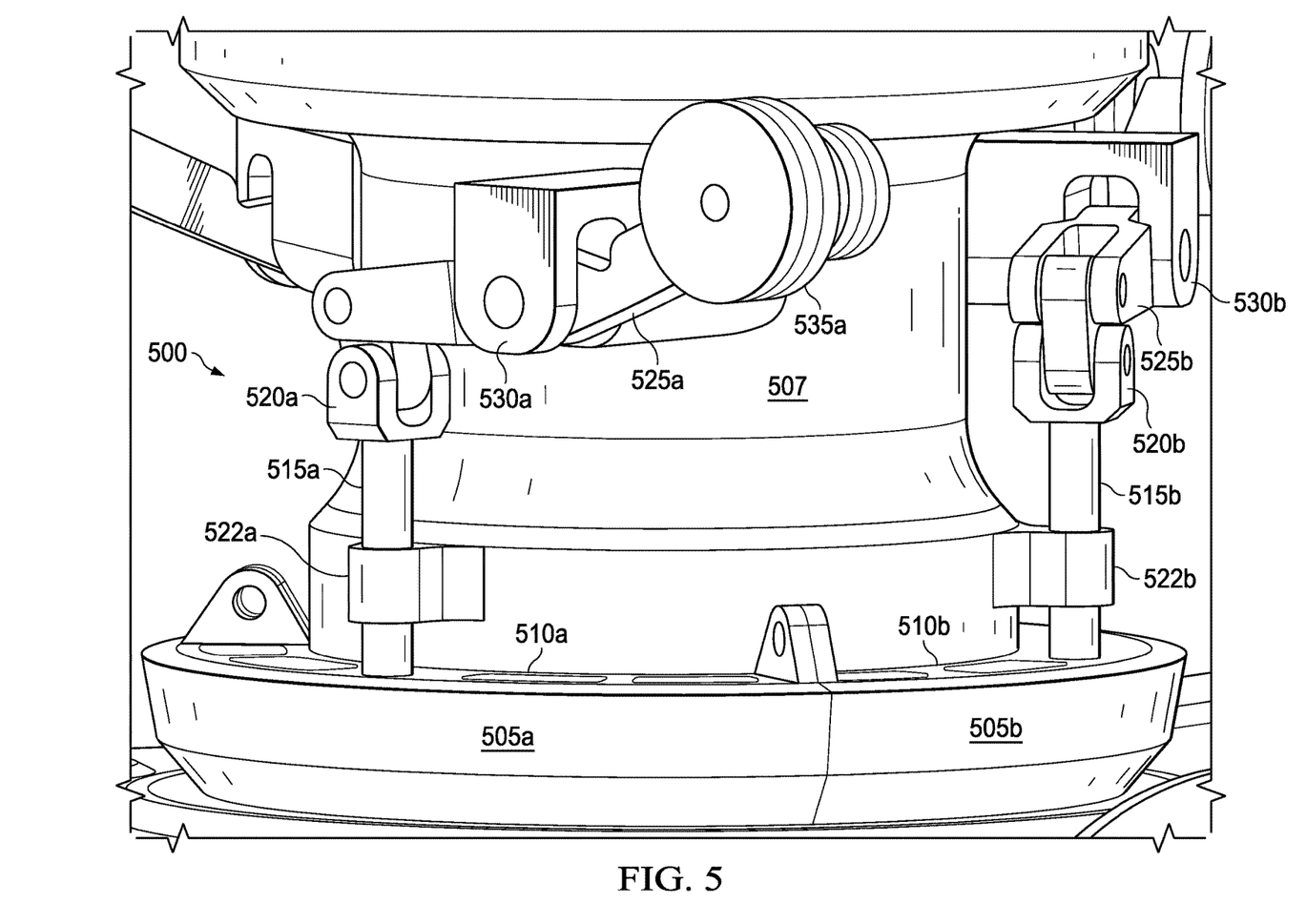
FIG. 5 illustrates a perspective view of an embodiment of the present invention in its disengaged position.

FIG. 5 depicts an embodiment of the present invention, which is a passive hub flapping lock 500. This embodiment includes three similar sections, but embodiments may have two or more similar sections. In the view of FIG. 5, the flapping lock 500 is in the disengaged position to afford better visibility of components. Stop wedges 505a, 505b, and 505c (505c not shown) are the components of the flapping lock 500 that wedge between the rotor yoke 502 and the mast sleeve 507 to prevent the rotor yoke 502 from flapping at low rotational speeds and when stationary. Herein, mast sleeve 507 is pictured in the figures and discussed, but some aircraft may not have a mast sleeve 507 around a mast. One skilled in the art of aircraft rotors and masts will recognize that embodiments of the invention may be used with aircrafts that do not have a mast sleeve, in which case an embodiment of the present invention would be arrayed around the mast, and the mast would be where mast sleeve 507 is pictured in the figures and would be discussed where the mast sleeve 507 is discussed. The stop wedges, which need to provide soft yet firm resistance to hub flapping, may be made of elastomeric material(s) such as include one or more polymers, or one or more rubbers such as butyl rubber, nitrile rubber, silicone rubber, or they may be made of a foam or of soft metals such as brass or aluminum to cushion the interface between the mast sleeve 507 and the rotor when the flapping lock 500 is engaged. Frames 510a, 510b, and 510c (510c not shown), support stop wedges 505a, 505b, and 505c. The mast sleeve 507 or the frames 510a, 510b, and 510c may be coated with a substance such as TEFLON® or similar materials or coatings to reduce a friction of the movement of the frames 510a, 510b, and 510c along the mast sleeve 507 when the flapping lock 500 is in motion. Rods 515a, 515b, and 515c (515c not shown) and brackets 520a, 520b, and 520c (520c not shown) connect frames 510a, 510b, and 510c and stop wedges 505a, 505b, and 505c to the mechanisms that engage and disengage the flapping lock 500. Rod sleeves 522a, 522b, and 522c may hold the rods 515a, 515b, and 515c in place or stabilize the rods 515a, 515b, and 515c, and the rod sleeves 522a, 522b, and 522c may be equipped with linear ball bearings (not shown) to ease movement of the rods 515a, 515b, and 515c. The rod sleeves 522a, 522b, and 522c may be coated with a substance such as TEFLON® or similar materials or coatings to reduce a friction of the movement of the rod sleeves 522a, 522b, and 522c along the mast sleeve 507 when the flapping lock 500 is in motion. Lever arms 525a, 525b, and 525c (525c not shown) rotate on pivots 530a, 530b, and 530c (530c not shown) and are coupled to rods 515a, 515b, and 515c at brackets 520a, 520b, and 520c. The rods 515a, 515b, and 515c may be coupled to the lever arms 525a, 525b, and 525c with directly or with links, and the couplings may include roller bearings. Such link may also include link torsion springs (not shown). Pivot torsion springs (not shown) are at the pivots 530a, 530b. Weight sets 535a, 535b, and 535c (535c not shown) are coupled to lever arms 525a, 525b, and 525c at the ends of the lever arms 525a, 525b, and 525c opposite ends coupled to brackets 520a, 520b, and 520c. The weight sets 535a, 535b, and 535c may include weights including dense metal such as tungsten for compactness. The weight sets 535a, 535b, and 535c can be adjusted to set the rotational speed at which the flapping lock 500 will disengage.

When the mast sleeve 507 and rotor yoke 502 are stationary or rotating slowly, the stop wedges 505a, 505b, and 505c, frames 510a, 510b, and 510c, rods 515a, 515b, and 515c, and brackets 520a, 520b, and 520c pull the lever arms 525a, 525b, and 525c down, with the aid of the pivot torsion springs at the pivots 530a, 530b, and 530c (and, if present, the link torsion springs), against the weight of the weight sets 535a, 535b, and 535c, so that the stop wedges 505a, 505b, and 505c and frames 510a, 510b, and 510c sit in the gap between the mast sleeve 507 and the rotor yoke 502 and prevent movement. When the mast sleeve 507 and rotor yoke 502 are rotating rapidly, the weight sets 535a, 535b, and 535c move outward, overcoming the pivot torsion springs at the pivots 530a, 530b, and 530c (and, if present, the link torsion springs), lowering the weighted ends of the lever arms 525a, 525b, and 525c to which they are attached and raising the ends opposite and the portions of the flapping lock that are attached to them out of the gap between the mast sleeve 507 and the rotor yoke 502, allowing movement.

Figure 6:
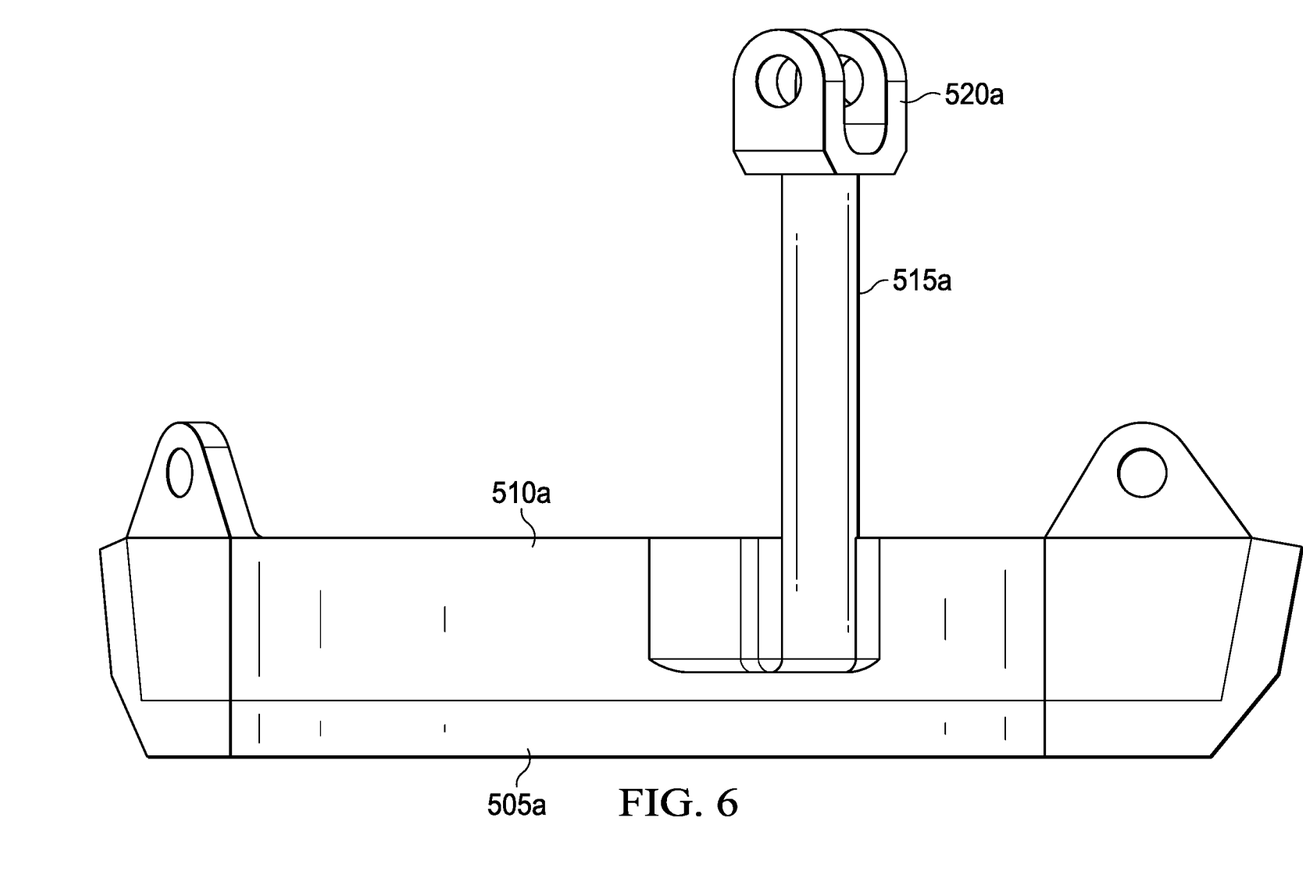
FIG. 6 illustrates a portion of an embodiment of the present invention shown in FIG. 5.

FIG. 6 shows portions of the embodiment of the present invention pictured in FIG. 5. In this embodiment, the flapping lock 500 includes three similar sections. FIG. 6 illustrates a portion of one of these sections including stop wedge 505a, frame 510a, rod 515a, and bracket 520a.

Figure 7A:
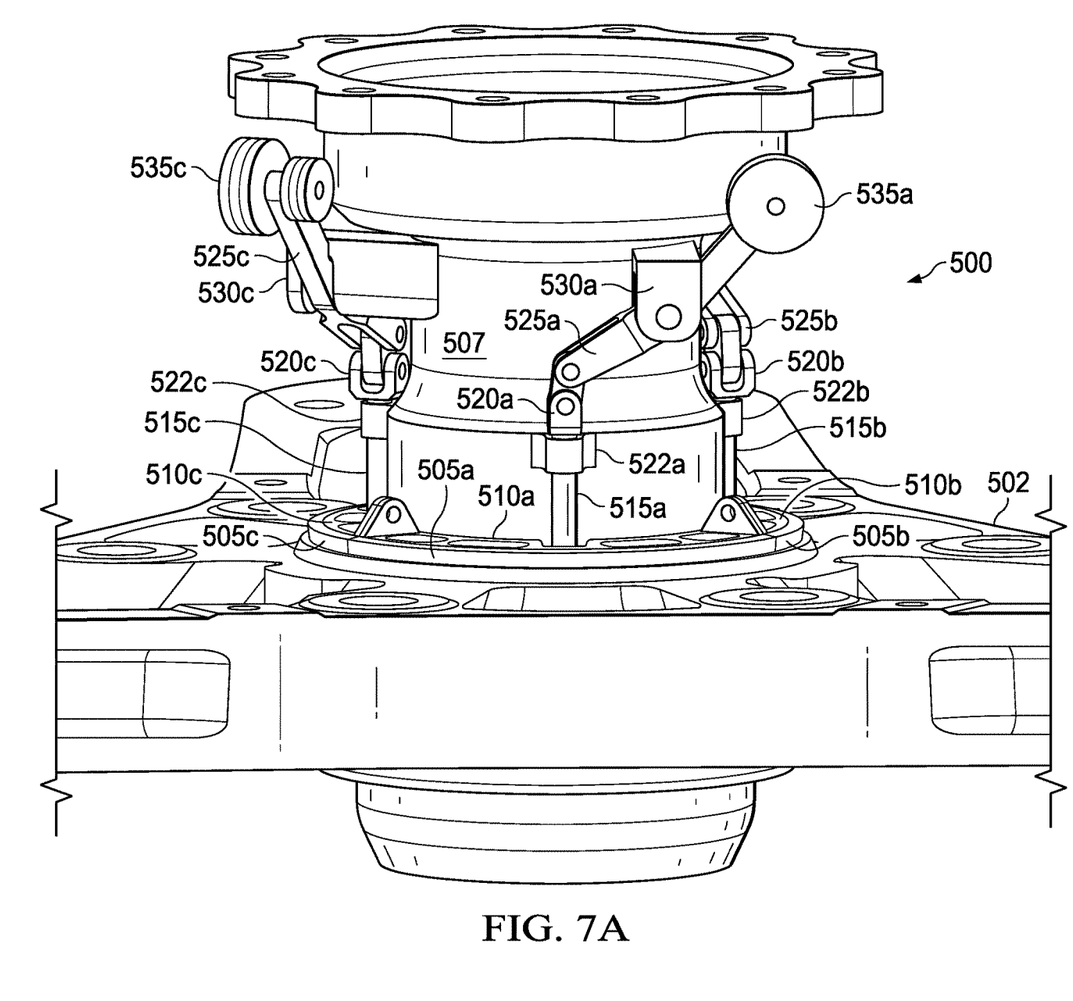
FIG. 7A depicts a perspective view of an embodiment of the present invention in its engaged position.

FIG. 7A illustrates the flapping lock 500 in its engaged position to stop the mast sleeve 507 from flapping on the rotor yoke 502. One of the three sections is completely visible, while two other sections are partly visible. FIG. 7A shows stop wedge 505a, frame 510a, rod 515a, bracket 520a, lever arm 525a, pivot 530a, and weight set 535a. FIG. 7A also illustrates stop wedge 505b, frame 510b, rod 515b, bracket 520b, and lever arm 525b, and stop wedge 505c, frame 510c, rod 515c, bracket 520c, lever arm 525c, pivot 530c, and weight set 535c.

Figure 7B:
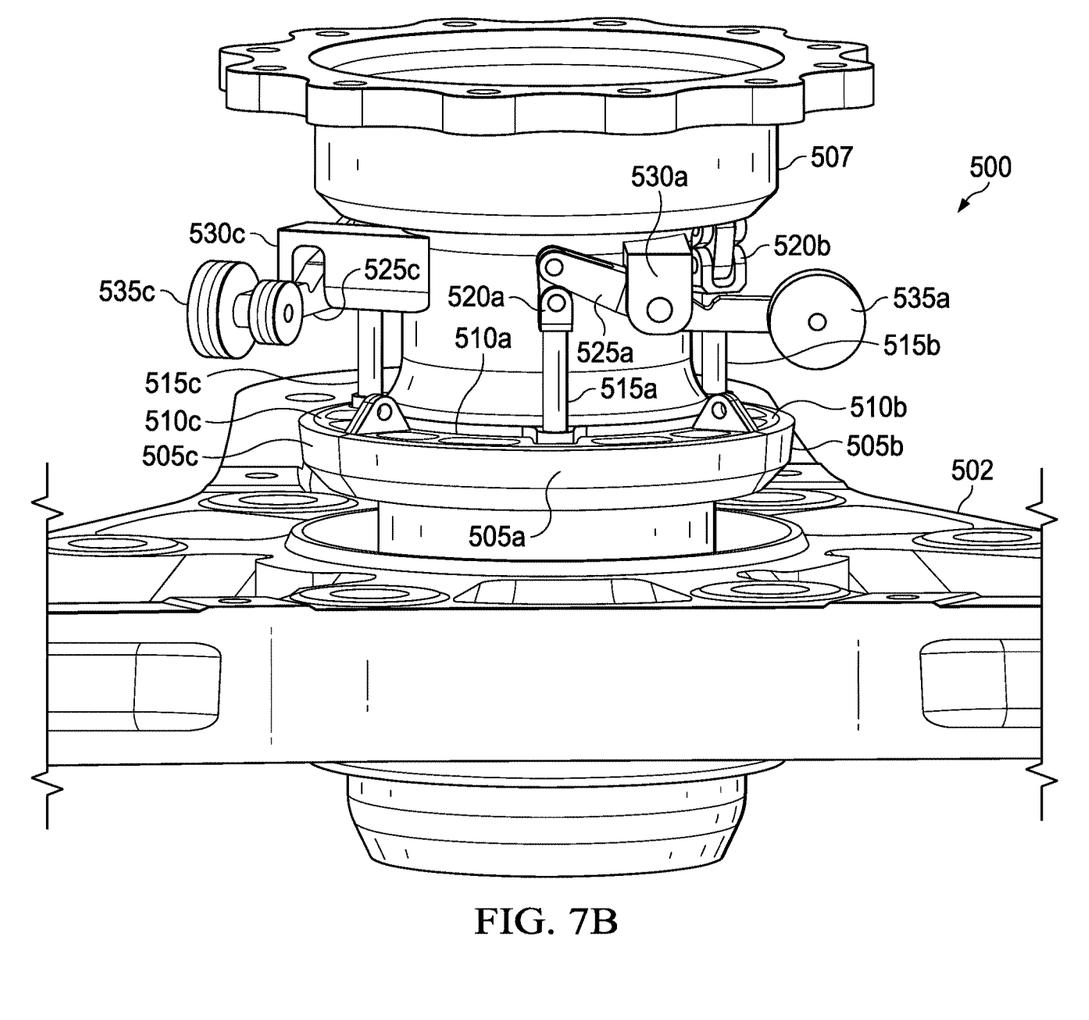
FIG. 7B depicts a perspective view of an embodiment of the present invention in its disengaged position.

FIG. 7B shows the flapping lock 500 in its fully disengaged position. FIG. 7B illustrates all of the same components of flapping lock 500 listed with regard to FIG. 7A.

Figure 8:
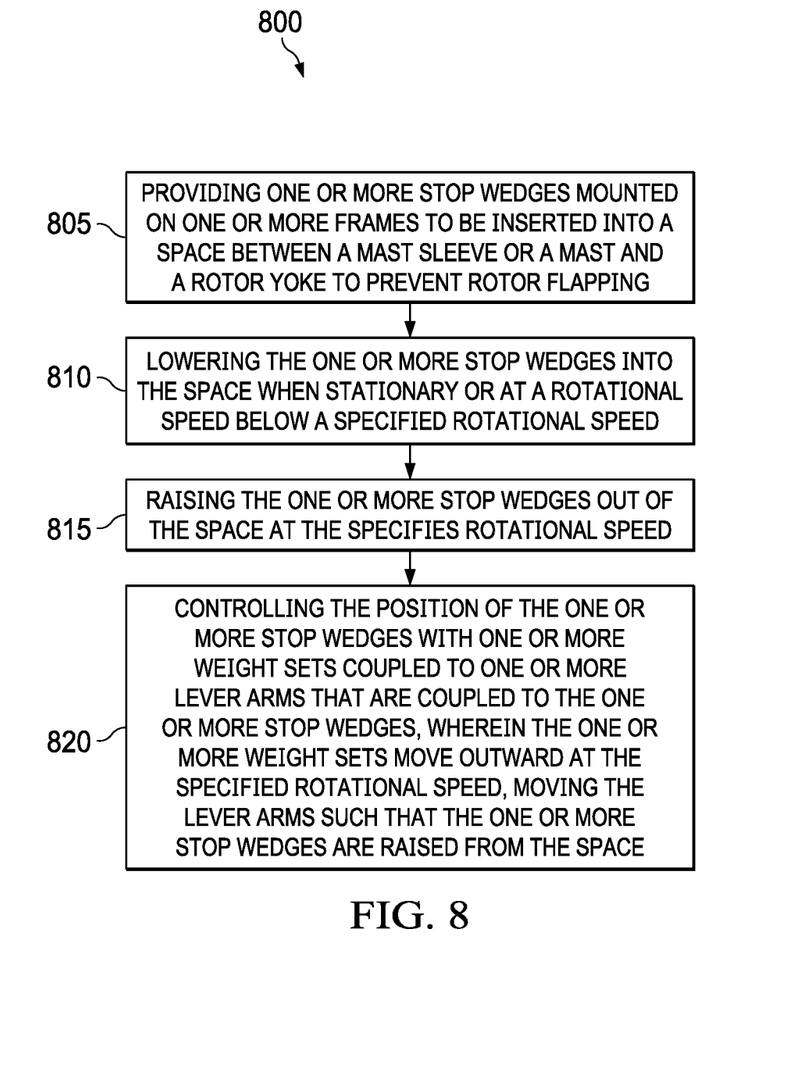
FIG. 8 illustrates a flowchart of a method embodiment of the present invention.

FIG. 8 illustrates a flowchart of a method embodiment of the present invention. Method 800 for preventing rotor flapping includes block 805, providing one or more stop wedges mounted on one or more frames to be inserted into a space between a mast sleeve or a mast and a rotor yoke to prevent rotor flapping. Block 810 includes lowering the one or more stop wedges into the space when stationary or at a rotational speed below a specified rotational speed. Included in block 815 is raising the one or more stop wedges out of the space at the specified rotational speed. Block 820 includes controlling the position of the one or more stop wedges with one or more weight sets coupled to one or more lever arms that are coupled to the one or more stop wedges, wherein the one or more weight sets move outward at the specified rotational speed, moving the lever arms such that the one or more stop wedges are raised from the space.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:

1. A passive hub flapping lock comprising:
   one or more lever arms, each lever arm rotatably coupled to a pivot and comprising a first lever arm end and a second lever arm end;
   one or more stop wedges;
   one or more frames coupled to the one or more stop wedges, each frame coupled to the first lever arm end of one of the one or more lever arms;
   one or more weight sets, each weight set comprising one or more weights coupled to the second lever arm end of one of the one or more lever arms; and
   one or more pivot torsion springs, each pivot torsion spring positioned at the pivot.

2. The flapping lock of claim 1, wherein the pivot torsion spring is biased to hold the flapping lock in an engaged position when stationary or at a rotational speed below a specified rotational speed.

3. The flapping lock of claim 1, wherein the flapping lock is in an engaged position when stationary or at a rotational speed below the specified rotational speed.

4. The flapping lock of claim 1, wherein the flapping lock is in a disengaged position when at a rotational speed above the specified rotational speed and the one or more weight sets move outward, rotating the one or more lever arms.

5. The flapping lock of claim 1, wherein the one or more stop wedges comprise an elastomeric material, a foam, a soft metal, or a combination of two or more of those materials.

6. The flapping lock of claim 1, further comprising one or more rods, each rod coupling the first lever arm end of one of the one or more lever arms to one of the one or more frames.

7. The flapping lock of claim 6, wherein the one or more rods are held in place or stabilized by one or more rod sleeves.

8. The flapping lock of claim 7, wherein at least a portion of each of the one or more rod sleeves adjacent to a mast sleeve or a mast is coated with one or more substances to reduce a friction of a motion of the one or more rod sleeves against the mast sleeve or the mast.

9. The flapping lock of claim 7, wherein the rod sleeves comprise linear ball bearings.

10. The flapping lock of claim 6, wherein each of the one or more lever arms is coupled to one of the one or more rods with a roller bearing directly or with a link.

11. The flapping lock of claim 1, wherein each of the one or more weight sets is adjustable to set the specified rotational speed.

12. The flapping lock of claim 1, wherein at least a portion of a mast sleeve, a mast, or each frame is coated with one or more substances to reduce a friction of a motion of the one or more frames against the mast sleeve or the mast.

13. A method of preventing hub flapping comprising:
providing one or more stop wedges mounted on one or more frames;
lowering the one or more stop wedges into a space between a mast sleeve or a mast and a rotor yoke when stationary or at a rotational speed below a specified rotational speed;
raising the one or more stop wedges out of the space at the specified rotational speed;
keeping the one or more stop wedges out of the space when above the specified rotational speed; and
controlling a position of the one or more stop wedges with one or more weight sets coupled to one or more lever arms that are rotatably coupled to a pivot and coupled to the one or more stop wedges.

14. The method of claim 13, wherein the one or more weight sets move outward at the specified rotational speed, moving the lever arms such that the one or more stop wedges are raised from the space.

15. The method of claim 13, wherein a pivot torsion spring is positioned at the pivot and biased to hold the flapping lock in an engaged position when stationary or at a rotational speed below a specified rotational speed.

16. The method of claim 13, wherein the one or more stop wedges comprise an elastomeric material, a foam, a soft metal, or a combination of two or more of those materials.

17. The method of claim 13, wherein one or more rods couple the one or more stop wedges with the one or more lever arms.

18. The method of claim 17, wherein each of the one or more lever arms is coupled to one of the one or more rods with a roller bearing directly or with a link.

19. The method of claim 17, wherein the one or more rods are held in place or stabilized by one or more rod sleeves.

20. The method of claim 19, wherein at least a portion of each of the one or more rod sleeves adjacent to the mast sleeve or the mast is coated with one or more substances to reduce a friction of a motion of the one or more rod sleeves against the mast sleeve or the mast.

21. The method of claim 17, wherein the one or more rod sleeves comprise linear ball bearings.

22. The method of claim 13, wherein each of the one or more weight sets is adjustable to set the specified rotational speed.

23. The method of claim 13, wherein at least a portion of the mast sleeve, the mast, or each frame is coated with one or more substances to reduce a friction of a motion of the one or more frames against the mast sleeve or the mast.

24. A rotorcraft comprising:
a fuselage;
one or more engines coupled to the fuselage;
one or more rotor assemblies coupled to the one or more engines; and
each of the one or more rotor assemblies comprising a flapping lock, the flapping lock comprising:
one or more lever arms, each lever arm rotatably coupled to a pivot and comprising a first lever arm end and a second lever arm end;
one or more stop wedges;
one or more frames coupled to the one or more stop wedges, each frame coupled to the first lever arm end of one of the one or more lever arms;
one or more weight sets, each weight set comprising one or more weights coupled to the second lever arm end of one of the one or more lever arms; and
one or more pivot torsion springs, each pivot torsion spring positioned at the pivot.

* * * * *